(12) United States Patent  
Hoffmann

(10) Patent No.: US 9,140,955 B2  
(45) Date of Patent: Sep. 22, 2015

(54) ELECTRO-OPTIC MODULATORS

(71) Applicant: FRAUNHOFER-GESELLSCHAFT ZUR FÖRDERUNG DER ANGEWANDTEN FORSCHUNG E.V., München (DE)

(72) Inventor: Detlef Hoffmann, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/378,942

(22) PCT Filed: Feb. 14, 2013

(86) PCT No.: PCT/EP2013/052937  
§ 371 (c)(1),  
(2) Date: Aug. 14, 2014

(87) PCT Pub. No.: WO2013/120931  
PCT Pub. Date: Aug. 22, 2013

(65) Prior Publication Data  
US 2014/0369637 A1 Dec. 18, 2014

(30) Foreign Application Priority Data  
Feb. 15, 2012 (EP) .................................... 12155607

(51) Int. Cl.  
*G02F 1/025* (2006.01)  
*G02F 1/225* (2006.01)  
(Continued)

(52) U.S. Cl.  
CPC .............. *G02F 1/2255* (2013.01); *G02F 1/011* (2013.01); *G02F 1/025* (2013.01); *G02F 1/0356* (2013.01);  
(Continued)

(58) Field of Classification Search  
CPC ........ G02F 1/0356; G02F 1/225; G02F 1/025  
See application file for complete search history.

(56) References Cited

U.S. PATENT DOCUMENTS

2005/0058385 A1* 3/2005 Tanbakuchi ...................... 385/1  
2005/0211875 A1 9/2005 Kawanishi et al.  
2010/0150494 A1 6/2010 Prosyk et al.

FOREIGN PATENT DOCUMENTS

EP 1 508 831 A1 2/2005  
WO 03/023502 A1 3/2003

OTHER PUBLICATIONS

Robert G. Walker, "High-Speed III-V Semiconductor Intensity Modulators", IEEE Journal of Quantum Electronics, vol. 27, Issue 3, Mar. 1991, pp. 654-667.

(Continued)

*Primary Examiner* — Jerry Rahll  
(74) *Attorney, Agent, or Firm* — Maschoff Brennan

(57) ABSTRACT

The invention relates to a Mach-Zehnder modulator comprising a first optical waveguide forming a first modulator arm and a second optical waveguide forming a second modulator arm of the Mach-Zehnder modulator, an electrode arrangement comprising a plurality of first waveguide electrodes for applying a voltage across the first optical waveguide and a plurality of second waveguide electrodes for applying a voltage across the second optical waveguide, at least one electrically conductive connecting element generating a short-circuit between at least one of the first waveguide electrodes and at least one of the second waveguide electrodes. The electrode arrangement is a travelling wave electrode arrangement further comprising a first and a second electrical line extending at least partially parallel to the first and second optical waveguide. The first and the second waveguide electrodes are connected to the first and second electrical lines via connecting structures.

20 Claims, 6 Drawing Sheets

(51) Int. Cl.
    *G02F 1/035* (2006.01)
    *G02F 1/01* (2006.01)
    *G02F 1/015* (2006.01)
    *G02F 1/21* (2006.01)

(52) U.S. Cl.
    CPC ........ *G02F 1/225* (2013.01); *G02F 2001/0157* (2013.01); *G02F 2001/212* (2013.01); *G02F 2201/122* (2013.01); *G02F 2201/127* (2013.01); *G02F 2203/15* (2013.01)

(56) References Cited

OTHER PUBLICATIONS

Kato et al., "10 Gb/s—80-km operation of full C-band InP MZ modulator with linear-accelerator-type tiny in-line centipede electrode structure directly driven by logic IC of 90-nm CMOS process", Optical Fiber Communication Conference and Exposition, Optical Society of America (OFC/OSA/NFOEC), and the National Fiber Optic Engineers Conference, Mar. 6-11, 2011, pp. 1-3.

Velthaus et al., "High performance InP-based Mach-Zehnder modulators for 10 to 100 Gb/s optical fiber transmission systems", 23rd International Conference on Indium Phosphide and Related Materials Compound Semiconductor Week, May 22-26, 2011, pp. 1-4.

Hoffmann et al., "45 GHz Bandwidth Travelling Wave Electrode Mach-Zehnder Modulator with Integrated Spot Size Converter", International Conference on Indium Phosphide and Related Materials, 16th IPRM, May 31-Jun. 4, 2004, pp. 585-588.

Krähenbühl et al., "Investigations on Short-Path-Length High-Speed Optical Modulators in LiNbO3 with resonant-type electrodes", Journal of Lightwave Technology, vol. 19, Issue 9, Sep. 2001, pp. 1287-1297.

Krähenbühl et al., "High-Speed Optical Modulator in LiNbO3 with Cascaded Resonant-Type Electrodes", Journal of Lightwave Technology, vol. 24, Issue 5, May 2006, pp. 2184-2189.

\* cited by examiner

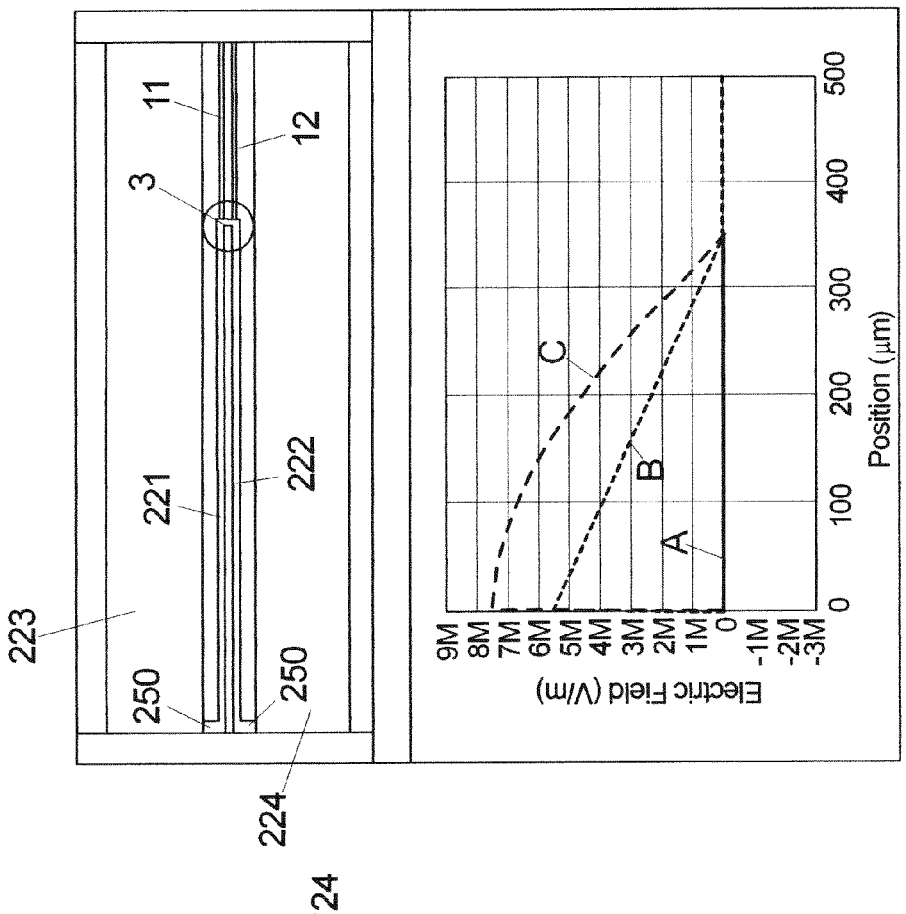
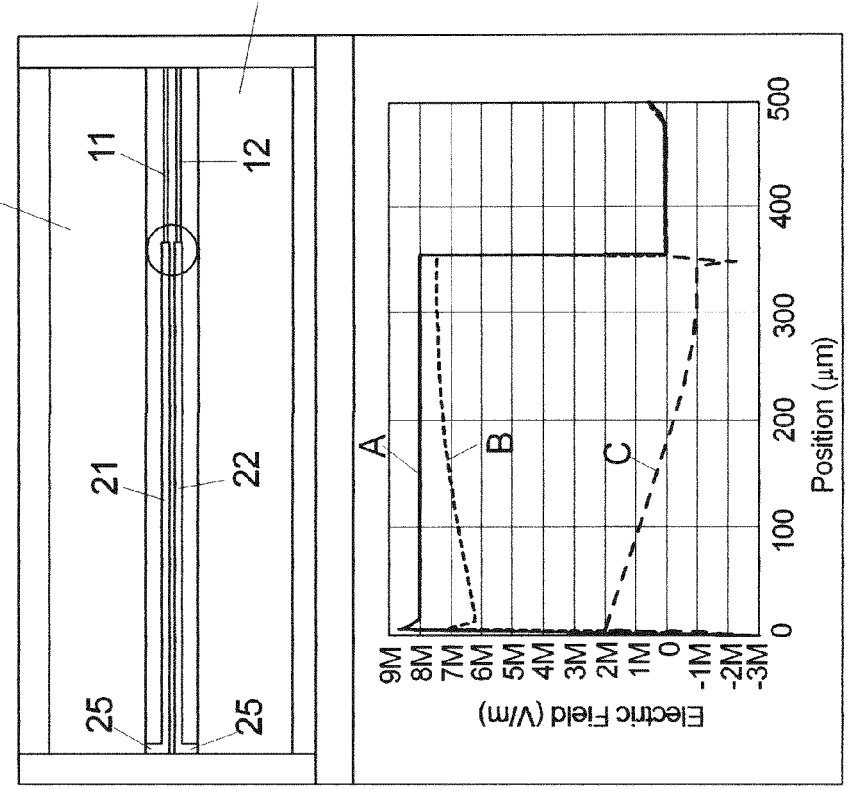

US 9,140,955 B2

ELECTRO-OPTIC MODULATORS

CROSS-REFERENCE TO A RELATED APPLICATION

This application is a National Phase Patent Application of International Patent Application Number PCT/EP2013/052937, filed on Feb. 14, 2013, which claims priority of European Patent Application Number 12155607.0, filed on Feb. 15, 2012.

BACKGROUND

The invention relates to electro-optic modulators.

It is known in the art to employ Mach-Zehnder interferometers as electro-optic modulators in optical high-speed transmission systems, wherein, for example, coplanar travelling wave electrodes (TWE) are used to induce a phase shift in the interferometer arms. These TWEs comprise a first and a second coplanar microwave line connected to a plurality of periodically arranged and capacitively coupled electrodes on top of the waveguides. Examples of such TWE-Mach-Zehnder modulators are described in the publication "High-Speed III-V Semiconductor Intensity Modulators", Robert G. Walker, IEEE Journal of Quantum Electronics Vol. 27, No. 3, March 1991. However, the electro-optic bandwidth of such TWE-Mach-Zehnder modulators is limited, for example, because of a mismatch between the electrical and the optical velocity, electrical losses in the device and impedance mismatching. Reducing the length of the electrodes may increase the bandwidth, wherein, however, a higher modulation voltage would then be required.

Another design concept of a Mach-Zehnder modulator is described in the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, disclosing a Mach-Zehnder modulator comprising a plurality of separated waveguide electrodes arranged on the optical waveguides of the modulator, wherein multiple drivers are used to individually drive the waveguide electrodes (distributed driver or segmented electrode design).

SUMMARY

It is an object of the invention to provide electro-optic modulators that have enhanced high frequency properties.

According to a first aspect of the invention, an electro-optic Mach-Zehnder modulator is provided, comprising:
- a first optical waveguide forming a first modulator arm and a second optical waveguide forming a second modulator arm of the Mach-Zehnder modulator;
- an electrode arrangement comprising a plurality of first waveguide electrodes for applying a voltage across the first optical waveguide and a plurality of second waveguide electrodes for applying a voltage across the second optical waveguide,
- at least one electrically conductive connecting element generating a short-circuit between at least one of the first waveguide electrodes and at least one of the second waveguide electrodes,
- wherein the electrode arrangement is a travelling wave electrode arrangement further comprising first and a second electrical lines extending at least partially parallel to the first and second optical waveguide, wherein the first and the second waveguide electrodes are connected to the first and second electrical lines via connecting structures, and
- wherein at least one voltage source or driver unit is connected to the first and second electrical line, wherein the first and second electrical lines and thus the first and second waveguide electrodes have different electrical potentials.

The electrode arrangement of the modulator is a travelling wave electrode arrangement that comprises a first and a second electrical line extending at least partially parallel to the first and second optical waveguide, wherein a (e.g. high frequency) voltage source (or a driver unit) is to be connected to the first and the second electrical line and wherein the first and the second waveguide electrodes are connected to the first and a second electrical line via connecting structures. For example, the first and the second electrical line are formed as coplanar microwave strip lines such that the basic electrical design of the Mach-Zehnder modulator may be a coplanar stripline (CPS) travelling wave design. The electrical lines and thus the waveguide electrodes obtain a different potential, wherein, for example, one of the electrical lines may have ground potential.

The connecting element realizes, for example, a galvanic connection between the first and the second waveguide electrode, thereby modifying the electro-optic properties of the first and second waveguide electrode. In particular, the connecting element is different from the connecting structures used to supply a voltage to the waveguide electrode(s) and the electrical line.

The dependency of the electro-optic properties on the frequency of the voltage signal supplied to the electrode arrangement is altered because of the short circuit relative to conventional non-short circuited waveguide electrodes: At low frequencies (i.e. the length of the first and the second waveguide electrodes is small relative to the wavelength of the electrical signal) the short circuit between the first and the second waveguide electrode has the effect that only a small or no voltage at all is applied across the optical waveguides because the electrical signal travelling along the first and the second waveguide electrode reaches the short circuit connecting element already after a short portion of the total signal period.

However, at higher frequencies (i.e. when the length of the first and the second waveguide electrodes is comparable to the wavelength of the electrical signal or even larger than the wavelength of the electrical signal) the electrical signal (e.g. a maximum or a minimum of the electrical signal) will travel along a section of the first and the second waveguide electrode for a time that is comparable to the signal period (or even larger than the signal period) before reaching the connecting element providing the short circuit such that during the travel time of the signal the amplitude of the signal may change by a relatively large amount. Thus, the high frequency electrical signal will be able to interact with the first and second optical waveguide before arriving at the connecting element (i.e. before it "sees" the short circuit), thereby enhancing the electro-optic high frequency characteristics of the modulator without requiring an increase of the modulation voltage.

The connecting element may be formed by an electrically conductive material (such as a metal). Accordingly, the connecting element has a low resistance; for example, below 1 Ω Ohm (e.g. of several mΩ). For example, the connecting element is (e.g. integrally) formed from the same material as the first and the second waveguide electrode it is connected to. According to an embodiment of the invention, the connecting element at least partially extends between the first and the second waveguide electrode it is connected to, wherein it may extend over a gap between the first and the second optical waveguide, i.e. the connecting element may be formed as an air bridge.

Further, it is possible that the connecting element is connected to a connecting portion of a first waveguide electrode and a connecting portion of a second waveguide electrode, wherein the connecting portions of the waveguide electrodes are located opposite to one another in a direction perpendicular to the first and the second waveguide. In particular, the first and the second waveguide electrode which are connected to one another via the connecting element extend parallel to one another, wherein the endings of the first waveguide electrode aligns with the endings of the second waveguide electrode.

The connecting element may be a longitudinal element whose first end is connected to a first waveguide electrode and whose second end is connected to a second waveguide element. For example, the length of the connecting element is at least twice its width.

In particular, the connecting element connects an ending of a first waveguide electrode to an ending of a second waveguide electrode, wherein the endings of the waveguide electrodes in each case are arranged opposite to one another in a direction perpendicular to the first and the second optical waveguide. Of course, more than one connecting element can be arranged. For example, the Mach-Zehnder modulator according to the invention comprises a first connecting element that connects a first ending of a first waveguide electrode to a first ending of a second waveguide electrode and a second connecting element connects a second ending of the first waveguide electrode to a second ending of the second waveguide electrode, wherein, for example, the first endings and the second endings of the waveguide electrodes, each are arranged opposite to one another in a direction perpendicular to the first and the second optical waveguide.

Moreover, the first and the second waveguide electrodes may be arranged on top of capacitive segments of the optical waveguides, wherein the capacitive segments may be formed by a (biased) diode such as a p-i-n diode, an n-i-n diode or a Schottky diode. Also, the first and the second waveguide electrodes may be longitudinal structures extending along the first and the second optical waveguide, respectively.

In an embodiment of the invention, several but not all of the first waveguide electrodes and second waveguide electrodes are connected by electrically conductive connecting elements, wherein each electrically conductive connecting element generates a short-circuit between one of the first waveguide electrodes and one of the second waveguide electrodes. By providing short-curcuits between some, but not all of the first and second waveguide electrodes, the bandwidth of the modulator can be increased compared to standard modulators which consist solely of first and second waveguide electrodes which are not short-circuited.

Further more, the Mach-Zehnder modulator may comprise an electrode arrangement having a first section having at least one first waveguide electrode and at least one second waveguide electrode and a second section having at least one first waveguide electrode and at least one second waveguide electrode, wherein the connecting element provides a short circuit between the first waveguide electrode and the second waveguide electrode of the second section, the second section being galvanically separated from the first section. The first section may comprise a first and a second electrical line and the second section comprises a first and a second electrical line, e.g. both sections comprise coplanar lines realizing travelling wave electrodes. For example, the basic layout of the first section is a conventional layout of a travelling wave Mach-Zehnder modulator to which the second section is added for improving the overall high frequency characteristics of the modulator.

An example of a possible principal optical and electrical layout of a travelling wave modulator that can be used for realizing the first section of the electrode arrangement and the optical waveguides is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the optical and electrical design of the Mach-Zehnder modulator is incorporated by reference herewith. It is noted, however, that the invention is of course not restricted to a particular basic design of the Mach-Zehnder modulator. For example, the optical waveguides could also be formed as strongly guiding ("deep ridge") waveguides as disclosed in U.S. patent application Ser. No. 12/638,372 (published as U.S. 2010/0150494 A1) and in the article "High performance InP-based Mach-Zehnder modulators for 10 to 100 Gb/s optical fiber transmission systems", K.-O. Velthaus et al., Compound Semiconductor Week and 23rd International Conference on Indium Phosphide and Related Materials, CSW/IPRM 2011, which are also incorporated by reference herewith.

According to another embodiment, the first section of the electrode arrangement comprise a first and a second electrical line and the second section of the electrode arrangement also comprises a first and a second electrical line, wherein the electrical lines of the first section are capacitively coupled to the electrical lines of the second section. For example, for realizing the capacitive coupling, the first and/or the second electrical line of the first section comprises at least one recess, and the first and/or the second electrical line of the second section comprises at least one protrusion extending into the recess, or vice versa.

In an embodiment, at least one of the first and a second electrical lines is a U-shaped coplanar microwave line, and/or at least one of the first and a second electrical lines is a straight coplanar microwave line.

According to a further embodiment, the first and second electrical lines each extend in a distance to the first and second waveguide electrodes.

According to a second aspect of the invention, an electro-optic Mach-Zehnder modulator is provided, comprising:
  a first optical waveguide forming a first modulator arm and a second optical waveguide forming a second modulator arm of the Mach-Zehnder modulator;
  an electrode arrangement comprising a plurality of first waveguide electrodes for applying a voltage across the first optical waveguide and a plurality of second waveguide electrodes for applying a voltage across the second optical waveguide, wherein at least one voltage source is to be connected to the first waveguide electrodes and the second waveguide electrodes in such a way that the potential of the first waveguide electrodes is different from the potential of the second waveguide electrodes; and
  at least one electrically conductive connecting element generating a short-circuit between at least one of the first waveguide electrodes and at least one of the second waveguide electrodes,
  wherein the first waveguide electrodes are galvanically separated from one another and the second waveguide electrodes are galvanically separated from one another, and further comprising a plurality of driver units, wherein each one of the driver units is assigned to one of the first waveguide electrodes and to one of the second waveguide electrodes.

In this aspect of the invention, the first waveguide electrodes are galvanically separated from one another and the second waveguide electrodes are galvanically separated from one another, i.e. there is no galvanic connection among the first waveguide electrodes and there is no galvanic connection among the second waveguide electrodes (segmented electrode design). For example, the first waveguide electrodes are electrically isolated from one another and the second waveguide electrodes are electrically isolated from one another. For example, the Mach-Zehnder modulator comprises a plurality of (e.g. amplifying) driver units, wherein each one of the driver units is assigned to one of the galvanically separated first waveguide electrodes and one of the galvanically separated second waveguide electrodes.

Thus, the first and second waveguide electrodes can be driven individually (independent from one another) as described in the above mentioned publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, which in respect to the multiple driver arrangement is incorporated by reference herewith.

The invention, however, is not restricted to Mach-Zehnder modulators. Rather, the electro-optic modulator according to the invention may be an electro-absorption modulator, which, for example, comprises a single waveguide electrode only. For supplying a high frequency voltage to the waveguide electrode the electrode arrangement may comprise a first and a second electrical line arranged on different sides of the optical waveguide, wherein the voltage source supplies a signal voltage to the waveguide electrode and the first and second electrical line adjacent the waveguide electrode are connected to ground potential (ground-signal-ground configuration).

Accordingly, according to a third aspect of the invention, an electro-absorption modulator is provided, comprising:
  a single optical waveguide;
  an electrode arrangement comprising at least one waveguide electrode for applying a voltage across the optical waveguide and a first and a second electrical line,
  wherein the first and the second electrical lines are located adjacent and on different sides of the optical waveguide, the electrical lines extending at least essentially parallel to the optical waveguide,
  wherein at least one voltage source is to be connected to the waveguide electrode and the first and second electrical lines in such a way that the potential of the waveguide electrode is different from the potential of the first and second electrical lines; and
  at least one electrically conductive connecting element generating a short-circuit between the waveguide electrode and at least one of the first and second electrical lines.

The connecting element generates a short-circuit between the waveguide electrode and at least one of the two electrical lines. In particular, the electrode arrangement of the electro-absorption modulator comprises a first (conventional) section without a short-circuit between the waveguide electrode and the electrical line and a second section (e.g. galvanically separated from the first section) comprising the connecting element and thus a short-circuit between the waveguide electrode and the electrical line.

In an embodiment, the at least one waveguide electrode is arranged on top of the optical waveguide. In a further embodiment, the at least one electrically conductive connecting element is in the form of a metallic wire.

The invention also relates to a method for fabricating an electro-optic modulator, comprising the steps of:
  generating at least one optical waveguide;
  generating an electrode arrangement comprising at least one waveguide electrode for applying a voltage across the optical waveguide and at least one electrical line or another waveguide electrode, wherein at least one voltage source is to be connected to the waveguide electrode and the electrical line in such a way that the potential of the waveguide electrode is different from the potential of the electrical line; and
  generating at least one electrically conductive connecting element generating a short circuit between the waveguide electrode and the electrical line and/or between the waveguide electrode and the other waveguide electrode.

The invention also relates to a method for fabricating a Mach-Zehnder modulator comprising the steps of:
  generating a first optical waveguide forming a first modulator arm and a second optical waveguide forming a second modulator arm;
  generating an electrode arrangement comprising at least one first waveguide electrode and at least one second waveguide electrode for applying a voltage across the first and second optical waveguide; and
  generating at least one electrically conductive connecting element generating a short circuit between at least one of the first waveguide electrodes and at least one of the second waveguide electrodes.

BRIEF DESCRIPTION OF THE DRAWINGS

Embodiments of the invention will be described in more detail hereinafter with reference to the drawings, in which:

FIG. 5A shows the electrical field of a waveguide electrode of a conventional Mach-Zehnder modulator for three different frequencies.

FIG. 5B shows the electrical field of a short circuited waveguide electrode for three different frequencies.

DETAILED DESCRIPTION

Figure 1:
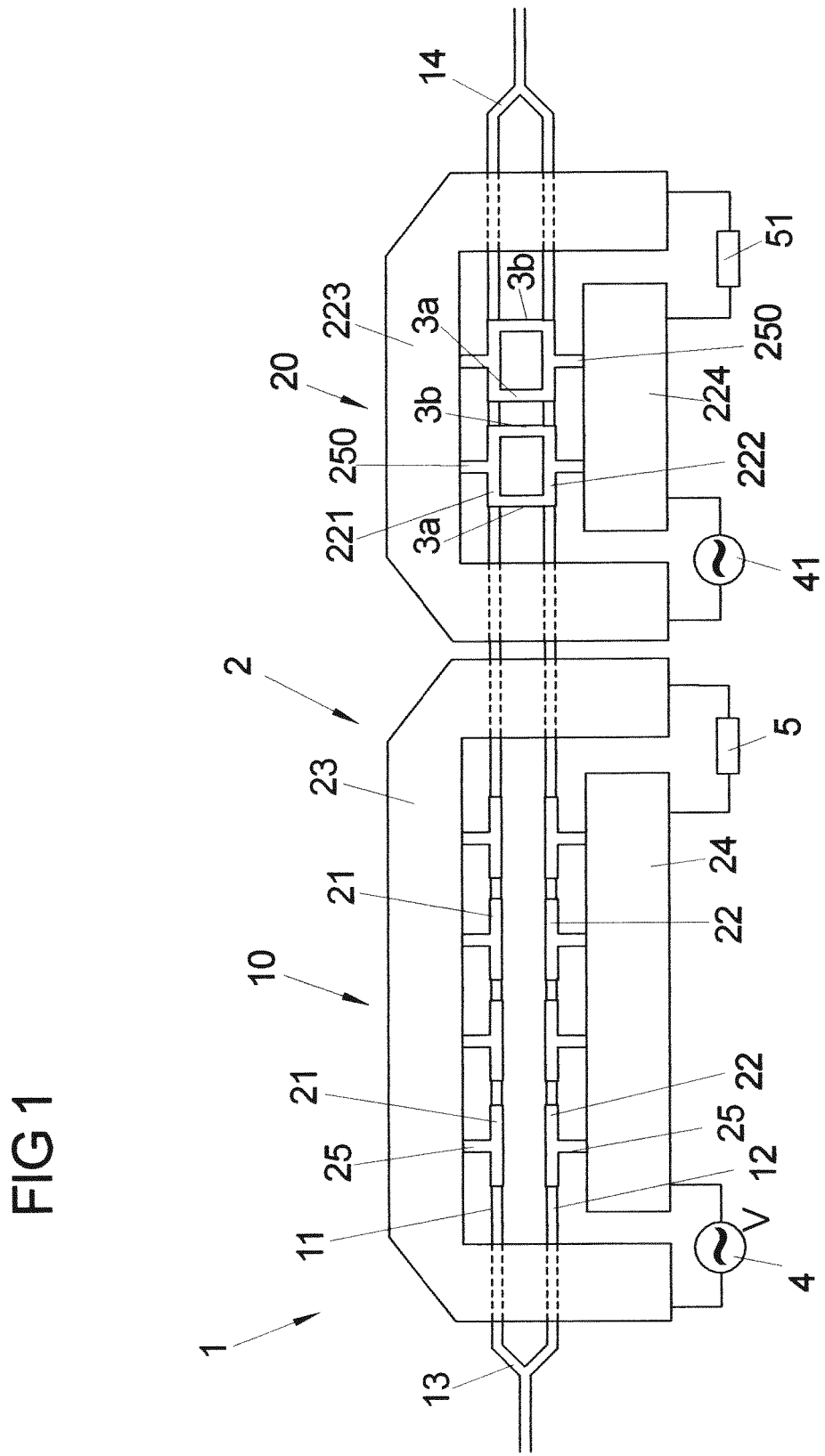
FIG. 1 illustrates a top view of an electro-optic modulator according to a first embodiment of the invention (Mach-Zehnder modulator).
Figure 2:
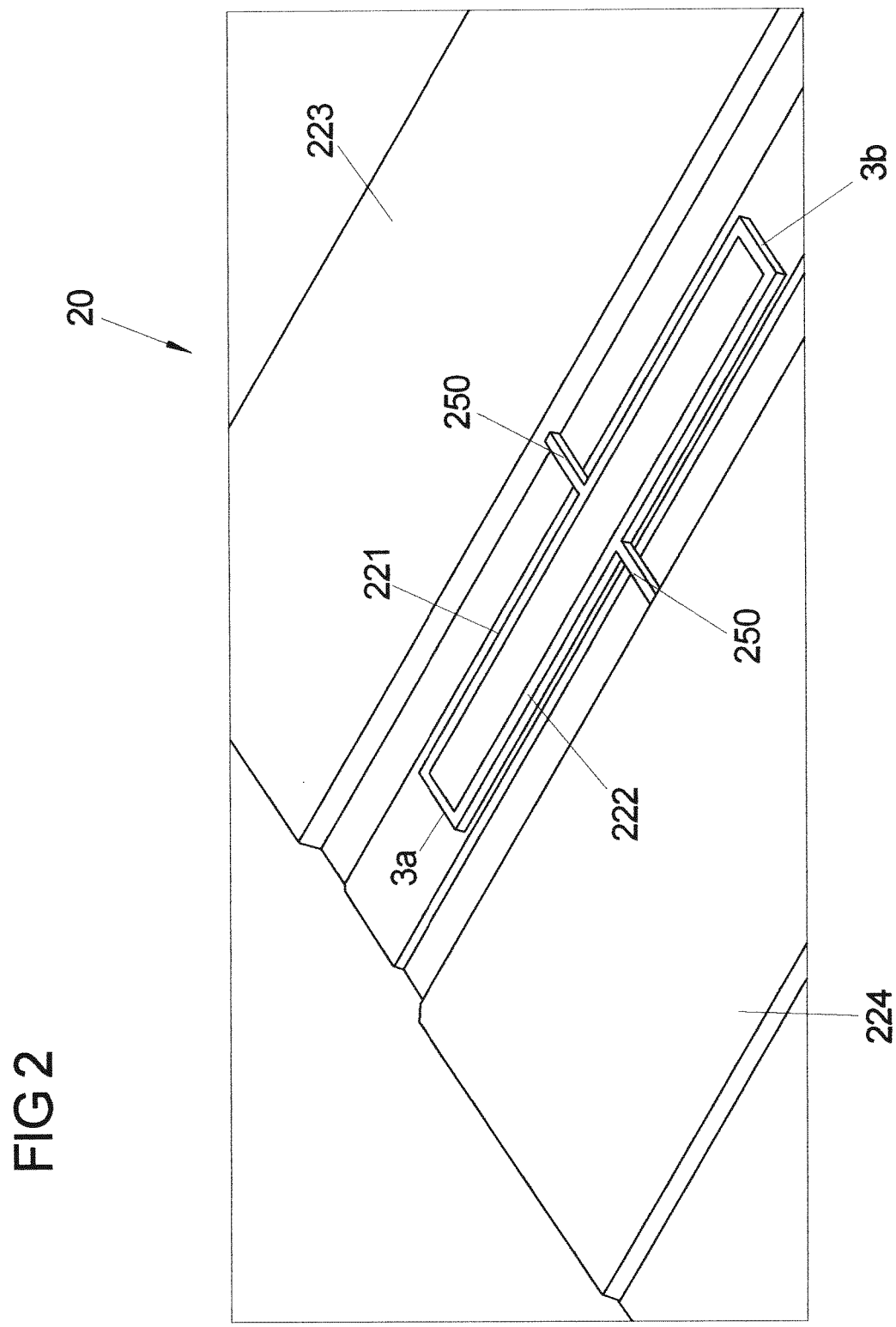
FIG. 2 depicts a perspective view of a detail of the electro-optic modulator shown in FIG. 1.

The Mach-Zehnder modulator 1 according to the invention shown in FIG. 1 comprises a first and a second optical waveguide 11, 12, wherein an optical input port of the modulator 1 comprises a splitter 13 that distributes the optical power inserted via the input port to the first and the second optical waveguide 11, 12. At the output port side of the modulator, the first and the second optical waveguide 11, 12 are merged in a combiner 14 (for example, realized by y-coupler or a multi mode interference—MMI device).

Further, the Mach-Zehnder modulator 1 comprises a travelling wave electrode arrangement 2 that consists of a first section 10 and a second section 20. The first section 10 comprises a plurality of first waveguide electrodes 21 and a plurality of second waveguide electrodes 22 for applying a voltage V supplied by a first high frequency voltage source 4 across the first and the second optical waveguide 11, 12 (in the region of the waveguide electrodes 21, 22). The first and second waveguide electrodes 21, 22 are arranged periodically (with a distance from one another) on top of and along the first and the second optical waveguide 11, 12, respectively. The travelling wave electrode arrangement 2 that is laid out as a coplanar signal ground line further comprises a first electrical line in the form of a first (U-shaped) coplanar microwave line 23 and a second (straight) coplanar microwave line 24, wherein a middle portion of the coplanar line 23 and the straight coplanar line 24 extend parallel to the first and the second optical waveguide 11, 12. The first and the second coplanar line 23, 24 are connected to the first and second waveguide electrodes 21, 22 via a plurality of connecting structures in the form of air bridges 25. The endings of the coplanar lines 23, 24 are terminated with a resistor 5, which may be a 50 Ohm resistor.

The electrode arrangement of the first section 10 may be configured similar to a conventional Mach-Zehnder modulator as disclosed, for example, in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, already mentioned above.

The second section 20 of the electrode arrangement 2 similarly to the first section 10 comprises a U-shaped coplanar line 223 and a straight coplanar line 224 (terminated by a (e.g. 50 Ohm) resistor 51, wherein the coplanar lines 223, 224 are galvanically separated from the coplanar lines 23, 24 of the first section 10 such that the sections 10, 20 of the electrode arrangement are galvanically separated. Also, the second electrode section 20 comprises a plurality (two) of first and second waveguide electrodes 221, 222 arranged on top of the optical waveguides 11, 12. The first and second waveguide electrodes 221, 222 of the second section 20 are connected to the coplanar lines 223, 224 by air bridges 250 (i.e., structures bridging the air gap). Further, a second high frequency voltage source 41 or driver unit is connected (e.g. using ac-coupling, i.e., a coupling that blocks DC by means of, e.g., a coupling capacitor) to the coplanar lines 223, 224 such that a high frequency voltage can be applied across the optical waveguides 11, 12 also in the region of the second electrode section 20, wherein the coplanar lines 223, 224 and thus the waveguide electrodes 221, 222 will have different electrical potentials (e.g. one of the coplanar lines 223, 224 is connected to ground potential or a differential driver may be employed to supply a complementary voltages to the coplanar lines 223, 224).

The second high frequency voltage source 41 is synchronized with the first high frequency voltage source 4 (e.g. in such a way that the phase shift between the first high frequency source 4 and the second high frequency source 41 equals that of the phase shift of an electrical signal that travels with the same speed as the optical signal from the left most first waveguide electrode 21 (or second waveguide electrode 22) of the first section 10 to the left most waveguide electrode 221 (or second waveguide electrode 222) of the second section 20. It is also possible that a single voltage source is used that outputs a first signal supplied to the first electrode section 10 and a second signal supplied to the second electrode section 20.

In contrast to the first section 10 of the electrode arrangement 2, the second section 20 comprises a plurality of electrically conductive connecting elements 3a, 3b arranged between the first and second waveguide electrodes 221, 222 in such a way that a short circuit between the first and the second waveguide electrodes 221, 222 is realized. In particular, each one of the first waveguide electrodes 221 is directly connected to one of the second waveguide electrodes 222 via two straight connecting elements 3a, 3b (running perpendicular to the waveguide electrodes 221, 222), wherein one of the connecting elements 3a is connected to a connecting portion of the first waveguide electrode 221 in the form of a first ending of the first waveguide electrode 221 and to a connecting portion of the second waveguide electrode 222 in the form of a first ending of the second waveguide electrode 222 (opposite the first ending of the first waveguide electrode 221), while another connecting element 3b connects a second ending of the first waveguide electrode 221 to a second ending of the second waveguide electrode 222.

Figure 3:
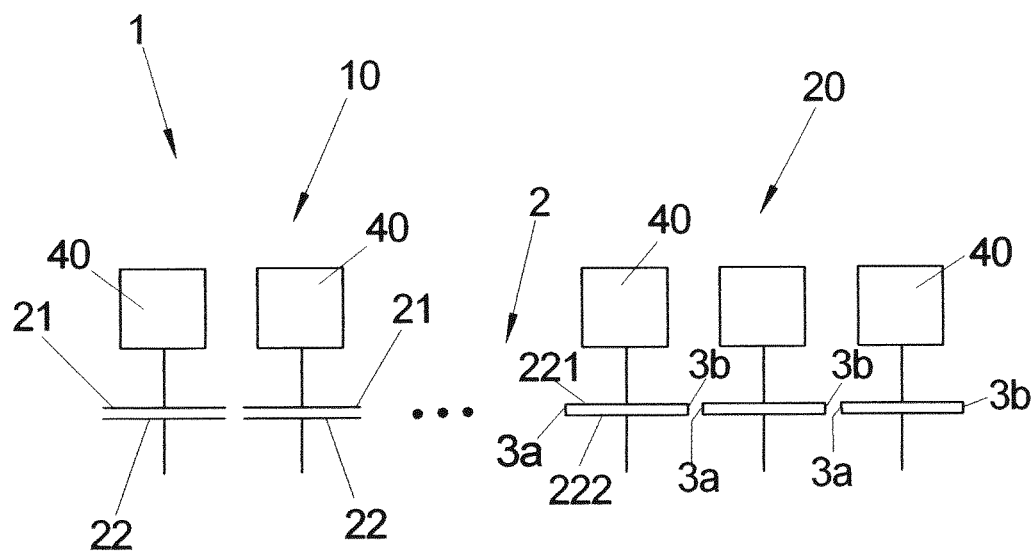
FIG. 3 illustrates a schematic view of an electro-optic modulator according to a second embodiment of the invention.

Thus, the endings of a pair of waveguide electrodes consisting of one first waveguide electrode 221 and one second waveguide electrode 222 are "closed". The connecting elements 3a, 3b closing the waveguide electrode pairs are also shown in FIG. 3. it is noted that at least one of the connecting elements 3a, 3b or an additional connecting element could be provided connecting one of the waveguide electrodes 221, 222 directly to the opposite coplanar line, i.e. to the coplanar line that has a potential different from the potential of the waveguide electrode. Further, the second section 20 could also be arranged in front of the first section 10.

It is noted that it is, of course, also possible that only one connecting element is assigned to each of the pairs consisting of one first and one second waveguide electrode 221, 222. For example, only one of the endings of the waveguide electrode pairs is closed (short-circuited) while the other ending is not. It is, however, also possible that more than two connecting elements are provided. Moreover, the connecting elements do not necessarily have to be arranged at the endings of the waveguide electrodes. Rather, at least one of the connecting elements assigned to a waveguide electrode pair may be arranged in a distance from both endings of the waveguide electrode pair (i.e. from the endings of the waveguide electrodes 221, 222).

The connecting elements 3a, 3b may be fabricated simultaneously with the waveguide electrodes 221, 222, the coplanar lines 223, 224 and the air bridges 250 (for example, using electroplating), wherein the connecting elements 3a, 3b may consist of the same material (e.g. gold) as the waveguide electrodes 221, 222 and may be integrally connected to the waveguide electrodes 221, 222.

For example, the total effective length of the waveguide electrodes 21, 22 of the first electrode section 10 is at least three times (e.g. approximately four times) the total effective length of the waveguide electrodes 221, 222 of the second section 20. The "total effective length" is the sum of the lengths of the waveguide electrodes 21, 221, 22 and 22, respectively. For example, the total effective length of the first waveguide electrodes 21 and the total effective length of the second waveguide electrodes 22 of the first electrode section 10 is approximately 4 mm, wherein the total effective length of the first waveguide electrodes 221 and the total effective length of the second waveguide electrodes 222 of the second section 20 is 1 mm. The length of (one of) the short-circuited first or second waveguide electrodes 221, 222 may be around a quarter of the wavelength at the desired cut-off frequency (which may be the electro-optic "3 dB-frequency").

The second electrode section 20 comprising the short-circuited first and second waveguide electrodes 221, 222 provides the possibility to enhance the electro-optic bandwidth of the Mach-Zehnder modulator due to the following effect (as already indicated above): A low frequency signal supplied to the waveguide electrodes 221, 222 has a wavelength that is large with respect to the length of the waveguide electrodes 221, 222 such that the short-circuited first and the second waveguide electrodes 221, 222 will essentially have the same potential such that no or only a small voltage is applied to the first and the second optical waveguide 11, 12.

However, supplying a high frequency (e.g. >10 GHz or >40 GHz) signal, however, means that the wavelength of the signal equals the length of the waveguide electrodes 221, 222 or is smaller than the length of the waveguide electrodes 221, 222. Depending on the velocity of the signal and the length of the waveguide electrodes 221, 222, thus, the potential of the first and the second waveguide electrodes 221, 222 will be different in the region between the air bridges and the short-circuited endings of the waveguide electrodes 221, 222 such that a voltage will be applied across the optical waveguides 11, 12. In particular, the voltage supplied to the optical waveguides 11, 12 is larger in the region of the air bridges 250 (in the region where the air bridges 250 interface the waveguide electrodes 221, 222) than in the region of the endings of the waveguide electrodes 221, 222 (i.e. in the region where the connecting elements 3 interface the waveguide electrodes 221, 222). In particular, the voltage applied to the optical waveguides 11, 12 may drop to zero in the region of the interface between the connecting elements 3 and the waveguide electrodes 221, 222, i.e. in the region of the short-circuit.

In a conventional modulator (no short-circuit between the waveguide electrodes, i.e. the endings of the waveguide electrodes are "open") at low frequencies the waveguide electrodes behave like capacitances (capacitively loading the coplanar lines). The difference between conventional waveguide electrodes and the short-circuited waveguide electrodes will be further explained with reference to FIG. 5A and 5B.

Figure 4:
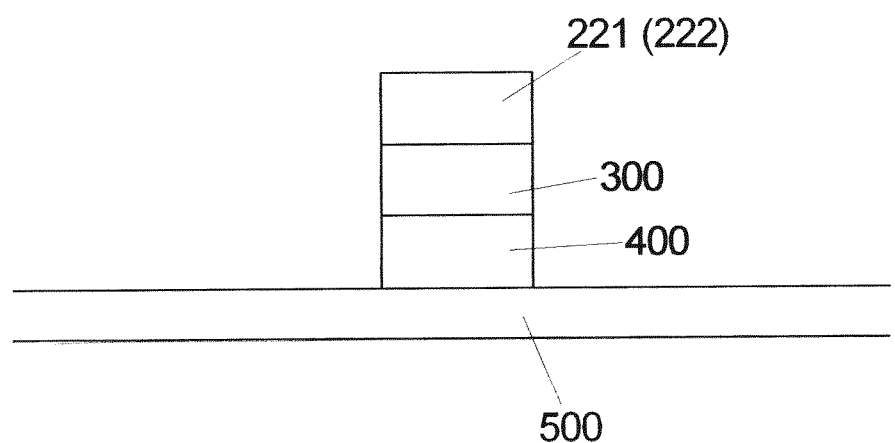
FIG. 4 illustrates a sectional view of an optical waveguide that may be used in an electro-optic modulator according to the invention.

The waveguide electrodes 221, 222 may be regarded as microstrip lines, wherein a signal supplied via the air bridges 250 propagates from the air bridges towards the endings of the first and second waveguide electrodes 221, 222, respectively. The propagation time the signal needs to travel from the air bridge 250 to an ending of the first or second waveguide electrodes 221, 222 depends on the distance between the air bridge and the ending of the waveguide electrode and the velocity of the supplied electrical signal. The velocity of the electrical signal is dependent from the layout of the waveguide electrodes 221, 222 and the design of the optical waveguides 11, 12 in the region of the waveguide electrodes 221, 222. For example, the optical waveguides 11, 12 in the region of the waveguide electrodes 221, 222 form a p-i-n diode as shown in FIG. 4, wherein the waveguide electrodes 221, 222 in combination with an upper p-doped region 300 realizes a signal path and a lower (e.g. broader) n-doped region 500 provides a "ground" electrode. The electrical field introduced via the waveguide electrodes 221, 222 spreads within an intrinsic region 400 located between the p-doped region 300 and the n-doped region 500. Thus, the velocity of the electrical signal conveyed by the waveguide electrodes 221, 222 and thus the enhancement of the high frequency properties of the modulator described above will depend on the layout of the p- and n-doped region 300, 500 and the intrinsic region 400 located between them.

FIG. 3 schematically depicts a Mach-Zehnder modulator 1 according to a second embodiment of the invention. The modulator 1 also comprises an electrode arrangement 2 consisting of a first and a second section 10, 20, wherein the first and the second section each comprise a plurality of first and second waveguide electrodes 21, 22 and 221, 222, respectively. The first and the second waveguide electrodes 21, 22 of the first section 10 and the first and the second waveguide electrodes 221, 22 of the second section 20 are arranged periodically (with a distance from one another) on top of the first and the second optical waveguide 11, 12, respectively.

However, in contrast to the travelling wave electrode arrangement of the first embodiment the first waveguide electrodes 21, 221 are galvanically separated (e.g. electrically isolated) from one another and also the second waveguide electrodes 22, 222 are galvanically separated from one another (segmented electrode arrangement). A plurality of (e.g. amplifying) driver units 40 is provided, wherein each one of the driver units 40 is assigned to one first waveguide electrode 21, 221 and one second waveguide electrode 22, 222. The basic layout of a segmented electrode modulator arrangement is described, for example, in the publication "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1, already mentioned above.

In the first section 10 of the electrode arrangement 2, the first waveguide electrodes 21 are galvanically separated from the second waveguide electrodes 22, whereas the second section 20 comprises a plurality of connecting elements 3a, 3b realizing short-circuits between the first and the second waveguide electrodes 221, 222. Similarly to the second electrode section of the first embodiment, two connecting elements 3a, 3b are assigned to one waveguide electrode pair consisting of one first and one second waveguide electrode 221, 222, the connecting elements 3a, 3b being arranged in such a way that they connect endings of the first and one second waveguide electrodes 221, 222 to one another. Due to the short-circuits provided by the second section 20 of the electrode arrangement 2, the high frequency properties of the Mach-Zehnder modulator are improved as set forth above with respect to the first embodiment.

The technical effect of short-circuiting a first waveguide electrode 221 and an opposite second waveguide electrode 222 is further explained with reference to FIG. 5A and 5B. The upper section of FIG. 5A illustrates a top view of a detail of a conventional travelling wave electrode arrangement exclusively comprising non-short-circuited first and second waveguide electrodes 21, 22, i.e. both endings of the shown waveguide electrode pair are open. The lower section of FIG. 5A represents the result of a high frequency simulation, wherein the simulated electrode section length is 500 µm (i.e. the length of the coplanar lines 23, 24 is 500 µm) and the lengths of the waveguide electrode pair 21, 22 is 350 µm such that the waveguide electrodes 21, 22 do not extend over the whole length of the optical waveguides 11, 12 of the simulated electrode section.

The air bridges 25 connecting the coplanar lines 23, 24 to the first and second waveguide electrode 21, 22 are located at the beginning of the simulated electrode section and not in the center of the section. The electrical field (y-axis) produced by one of the waveguide electrodes has been calculated dependent on the position (x-axis) along the simulated electrode section (i.e. along the optical waveguides 11, 12) at three different frequencies (curve A: 1 GHz, curve B: 20 GHz and curve C: 50 GHz) (wherein, "0" designates a position of the left end of the coplanar lines 23, 24 and "500" designates a position at the end of the coplanar lines 23, 24). As can be seen, the electrical field at the lowest frequency is nearly constant along the 350 μm long waveguide electrodes 21, 22 and drops to zero at position >350 μm as the waveguide electrodes 21, 22 end at 350 μm. The electrical field at 1 GHz is rather high, wherein the electrical field decreases when a signal of higher frequency is applied.

The drop of the electrical field at higher frequencies reduces the electro-optic effect and thus causes a drop of the frequency response of the modulator at higher frequencies.

FIG. 5B depicts the case that an electrically conductive connecting element 3 is arranged between the endings of the first and the second waveguide electrode 221, 222 such that a short-circuit is present between the waveguide electrodes providing a closed end of the waveguide electrode pair (formed by the waveguide electrodes 221, 222). It is noted that only one ending is provided with a connecting element such that one end of the waveguide electrode pair is closed and the other one is open. As can be seen from the corresponding calculation (illustrated below the top view of the electrode arrangement), in contrast to the conventional non-short-circuited waveguide electrode pair, the electrical field at the lowest frequency is nearly constantly zero due to the short-circuit, wherein at higher frequencies the electrical field increases in a distance from the end of the waveguide electrode and only begins to approach zero at positions >300 μm in FIG. 5B. It can be clearly seen that the electric field is always (for every operation frequency) forced to zero at the position (x=350 μm) where the short-circuit connecting element 3 is located.

As the phase shift of the optical signal induced by the electrical field produced by the waveguide electrodes is proportional to the integral of the electrical field over the length of the waveguide electrodes (i.e. the area below the curves in FIG. 5A and 5B, respectively), at higher frequencies the short-circuited waveguide electrodes produce a larger phase shift at the 50 GHz frequency, thereby improving the high frequency characteristics of the modulator.

Figure 6:
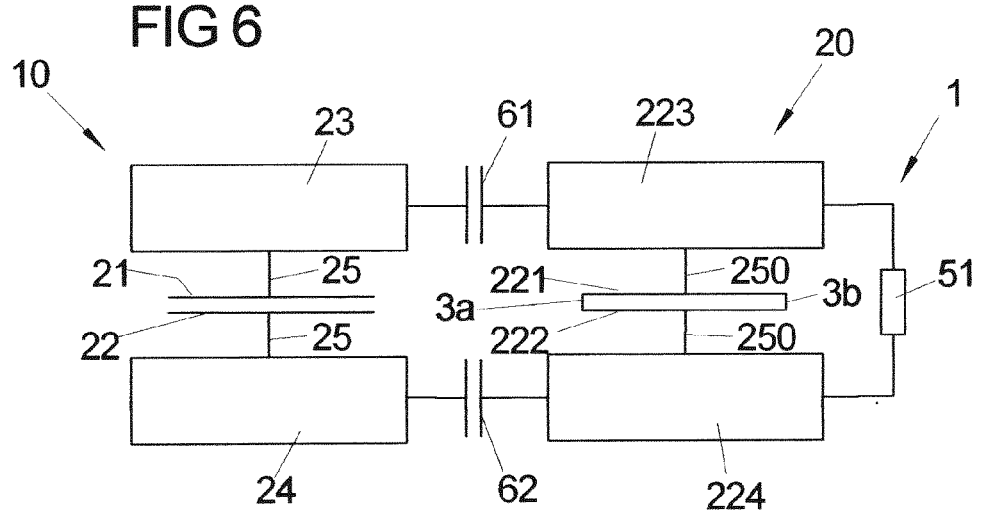
FIG. 6 illustrates a top view of an electro-optic modulator according to a third embodiment of the invention.

FIG. 6 schematically illustrates a possibility of operating a two-section travelling wave Mach-Zehnder modulator according to the invention (see, for example, FIG. 1) without the need of two separate high voltage sources (drivers). Rather, the coplanar electrodes 23, 24 of the first section 10 are capacitively coupled to the corresponding coplanar electrodes 223, 224 of the second section 20, wherein, for example, a first capacitor 61 is arranged between the (upper) coplanar lines 23, 223 and a second capacitor 62 is arranged between the (lower) coplanar lines 24, 224, the capacitors 61, 62 having a high capacitance.

According to another variant of this embodiment one of the capacitors 61, 62 is omitted, wherein a direct galvanic connection (or a single continuous coplanar line extending continuously from the first section to the second section) between the upper coplanar lines 23 and 223 or between the lower coplanar lines 24 and 224 could be arranged. In particular, if a galvanic connection is provided between either the upper or the lower coplanar lines 23, 223 and 24, 224, respectively, the connected coplanar lines may be connected to ground potential such that the overall capacitive coupling between the electrode sections 10 and 20 is maintained.

Figure 7:
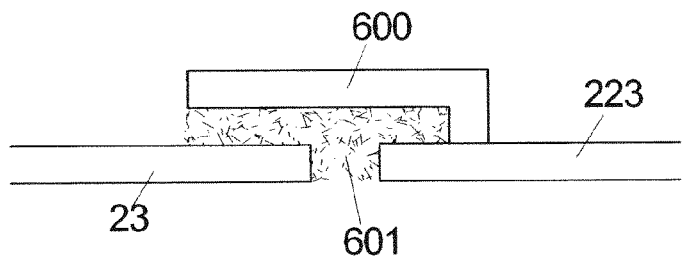
FIG. 7 shows a sectional view of a variant of the electro-optic modulator shown in FIG. 6.

FIG. 7 depicts a sectional view of a variant of realizing the capacitive coupling between the coplanar lines 23, 223, 24, 224 of the first and the second section 10, 20 of the electrode arrangement. At least one conductive bridge 600 (e.g. a gold bridge) extends over a gap between the upper coplanar lines 23 and 223, wherein the gap is filled with a dielectric material 601 such as silicon nitride. The dielectric material 601 is arranged in such a way that the bridge 600 is not connected to at least one of the coplanar lines 23, 223. As shown in FIG. 7, the conductive bridge is connected to the coplanar line 223 of the second section, but is arranged in a distance from the coplanar line 23 of the first section. It is also possible that the bridge 600 is distanced from both coplanar lines 23, 223, wherein the dielectric material 601 is arranged in the gaps between the bridge 600 and the coplanar lines 23, 223. It is noted that the bridge 600 (or another bridge) may extend over a gap between the lower coplanar lines 24, 224 also such that these coplanar lines are capacitively coupled, too.

Figure 8:
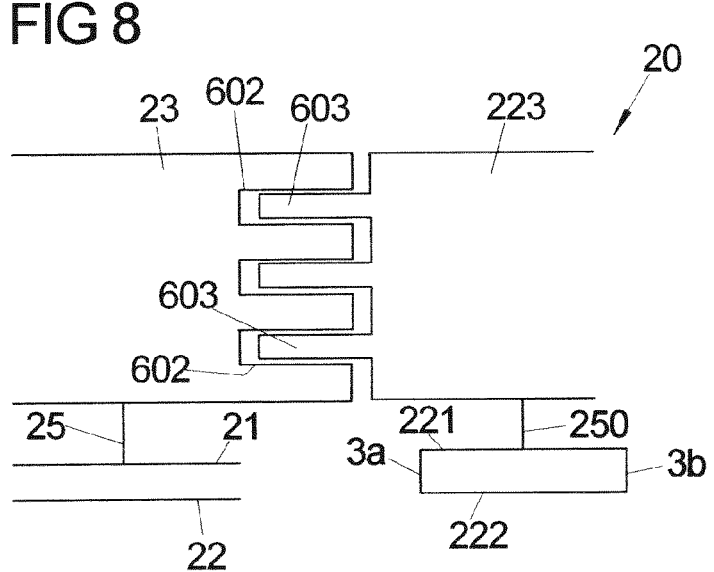
FIG. 8 shows a top view of another variant of the electro-optic modulator shown in FIG. 6.

FIG. 8 illustrates another option of realizing the capacitive coupling between the coplanar lines 23, 223, 24, 224 of the first and the second section 10, 20 of the electrode arrangement. The coplanar lines 23, 24 (only the upper coplanar line 23 is shown) of the first electrode section 10 comprise a plurality of recesses 602, wherein protrusions 603 (extending along the waveguide electrodes 21, 221) of the coplanar lines 223, 224 of the second electrode section 20 extend into the recesses 602, thereby realizing the capacitive coupling of the coplanar lines. The gaps between the coplanar lines 23, 24 of the first section 10 and the protrusions 603 may be filled with a dielectric material. Of course, it is also possible that the coplanar lines 23, 24 of the first section 10 comprise the protrusions and the coplanar lines 223, 224 of the second section 20 form the recesses.

It is noted that elements of the embodiments described above may also be used in combination. For example, the electrode arrangement may have both bridges 600 as shown in FIG. 7 and recess-protrusion pairs as shown in FIG. 8. Also, the dimensions of the waveguide electrodes of the first embodiment (travelling wave modulator) could be applied to the waveguide electrodes of the second embodiment (segmented electrode arrangement).

Figure 9:
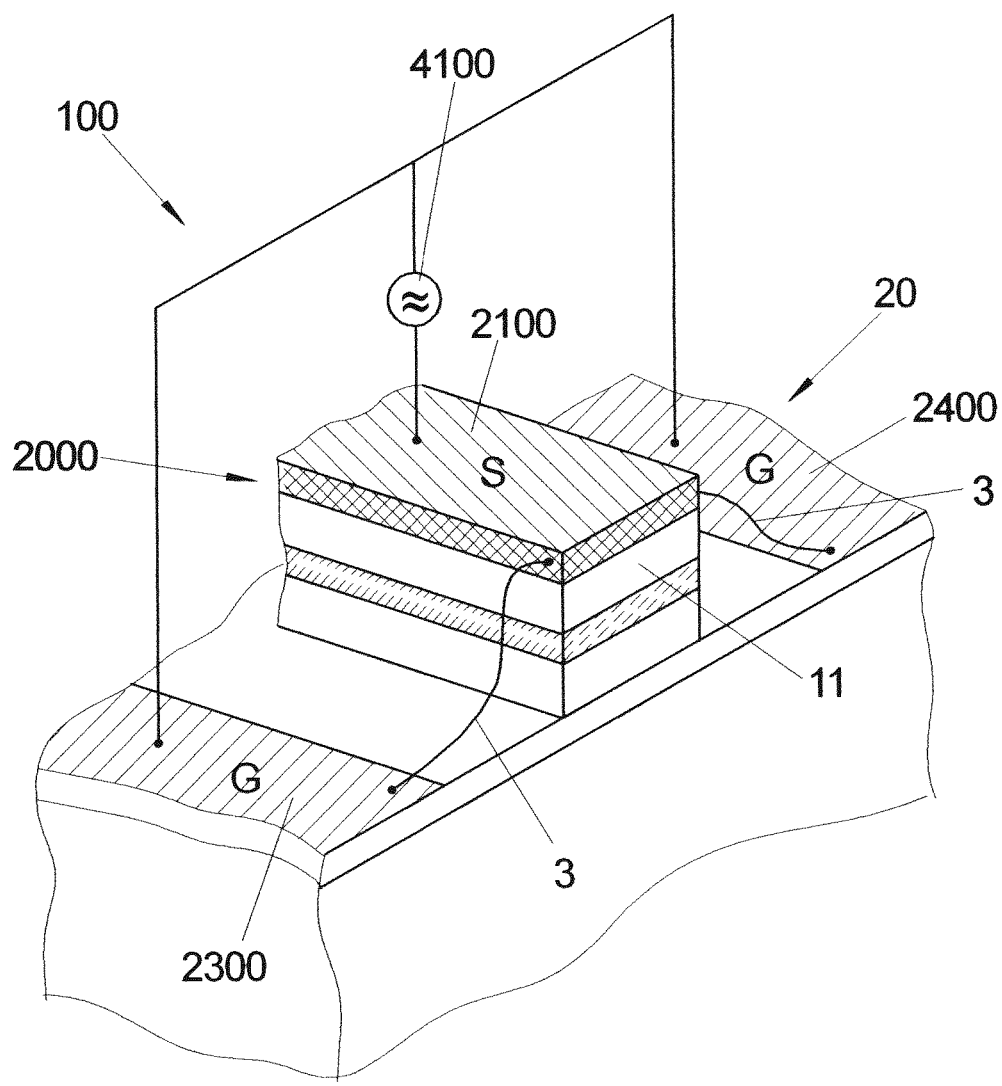
FIG. 9 illustrates a further embodiment of the electro-optic modulator according to the invention (electro-absorption modulator).

FIG. 9 relates to another embodiment of the invention, wherein the modulator is designed as an electro-absorption modulator 100 comprising an electrode arrangement 2000 having a first section (not shown) configured as a conventional electro-absorption modulator (no short-circuit between the electrical line and the waveguide electrode) and an additional section 20 galvanically separated from the conventional section. The modulator 100 comprises an optical waveguide 11, wherein the second electrode section 20 comprises a single waveguide electrode 2100 arranged on top of the optical waveguide 11.

Further, the second electrode section comprises a first and a second electrical line 2300, 2400 disposed adjacent the optical waveguide 11, the electrical lines 2300, 2400 extending at least essentially parallel to the optical waveguide 11. A high frequency voltage source 4100 is provided for supplying a high-frequency voltage to the waveguide electrode and the electrical lines 2300, 2400, wherein a signal voltage (S) is supplied to the waveguide electrode 2100 and the electrical lines 2300 and 2400 are connected to ground (G).

Further, electrically conductive (e.g. metallic) connecting elements 3 are arranged between the waveguide electrode 2100 and the electrical lines 2300, 2400 such that a short-circuit is generated between the signal-guiding waveguide electrode 2100 and the grounded electrical lines 2300, 2400.

The illustrated second section of the electro-absorption modulator 100 enhances the high frequency properties of the modulator as discussed above with respect to the Mach-Zehnder modulator.

REFERENCE SIGNS

1 Mach-Zehnder modulator
2, 2000 electrode arrangement
3, 3a, 3b connecting element
4 first voltage source
5, 51 resistor
10 first section
11 first optical waveguide
12 second optical waveguide
13 splitter
14 combiner
20 second section
21, 221 first waveguide electrode
22, 222 second waveguide electrode
23, 223 first coplanar line
24, 224 second coplanar line
25, 250 air bridge
40 driver
41 second voltage source
61, 62 capacitor
100 electro-absorption modulator
300 p-doped region
400 intrinsic region
500 n-doped region
600 conductive bridge
601 dielectric material
602 recess
603 protrusion
2100 waveguide electrode
2300 first electrical line
2400 second electrical line
4100 voltage source

The invention claimed is:

1. A Mach-Zehnder modulator comprising:
a first optical waveguide forming a first modulator arm and a second optical waveguide forming a second modulator arm of the Mach-Zehnder modulator;
an electrode arrangement comprising a plurality of first waveguide electrodes for applying a voltage across the first optical waveguide and a plurality of second waveguide electrodes for applying a voltage across the second optical waveguide,
at least one electrically conductive connecting element generating a short-circuit between at least one of the first waveguide electrodes and at least one of the second waveguide electrodes,
wherein the electrode arrangement is a travelling wave electrode arrangement further comprising a first and a second electrical line extending at least partially parallel to the first and second optical waveguide, wherein the first and the second waveguide electrodes are connected to the first and second electrical lines via connecting structures,
wherein at least one voltage source or driver unit is connected to the first and second electrical line, wherein the first and second electrical lines and thus the first and second waveguide electrodes have different electrical potentials, and
wherein the first waveguide electrodes are arranged with a distance from one another on top of the first optical waveguide and the second waveguide electrodes are arranged with a distance from one another on top of the second optical waveguide, wherein a middle portion of the first electrical line extends on a side of the first optical waveguide that faces away from the second optical waveguide and the second electrical line extends on a side of the second optical waveguide that faces away from the first optical waveguide.

2. The modulator as claimed in claim 1, wherein the connecting element extends at least between the short-circuited first and second waveguide electrode.

3. The modulator as claimed in claim 1, wherein the connecting element extends perpendicular to the short-circuited first and second waveguide electrodes.

4. The modulator as claimed in claim 1, wherein the connecting element extends over a gap between the first and the second optical waveguide.

5. The modulator as claimed in claim 1, wherein the connecting element is connected to a connecting portion of a first waveguide electrode and a connecting portion of a second waveguide electrode, wherein the connecting portions of the waveguide electrodes are located opposite to one another in a direction perpendicular to the first and the second waveguide.

6. The modulator as claimed in claim 1, wherein the connecting element connects an ending of a first waveguide electrode and an ending of a second waveguide electrode, wherein the endings of the waveguide electrodes are arranged opposite to one another in a direction perpendicular to the first and the second optical waveguide.

7. The modulator as claimed in claim 1, wherein a first connecting element connects a first ending of a first waveguide electrode to a first ending of a second waveguide electrode and a second connecting element connects a second ending of the first waveguide electrode to a second ending of the second waveguide electrode, wherein the first endings and the second endings of the first and the second waveguide electrode, respectively, are arranged opposite to one another in a direction perpendicular to the first and the second optical waveguide.

8. The modulator as claimed in claim 1, wherein several but not all of the first waveguide electrodes and second waveguide electrodes are connected by electrically conductive connecting elements, wherein each electrically conductive connecting element generates a short-circuit between one of the first waveguide electrodes and one of the second waveguide electrodes.

9. The modulator as claimed in claim 1, wherein the electrode arrangement comprises a first section having at least one first waveguide electrode and at least one second waveguide electrode and a second section having at least one first waveguide electrode and at least one second waveguide electrode, wherein the at least one connecting element provides a short circuit between at least one of the first waveguide electrodes and at least one of the second waveguide electrodes of the second section, the second section being galvanically separated from the first section.

10. The modulator as claimed in claim 9, wherein the first section of the electrode arrangement comprises a first and a second electrical line and the second section comprises a first and a second electrical line, wherein the electrical lines of the first section are capacitively coupled to the electrical lines of the second section.

11. The modulator as claimed in claim 10, wherein the first and/or the second electrical line of the first section comprises at least one recess, and the first and/or the second electrical line of the second section comprises at least one protrusion extending into the recess, or the first and/or the second electrical line of the second section comprises at least one recess, and the first and/or the second electrical line of the first section comprises at least one protrusion extending into the recess.

12. The modulator as claimed in claim 1, wherein at least one of the first and a second electrical lines is a U-shaped coplanar microwave line.

13. The modulator as claimed in claim 1, wherein at least one of the first and a second electrical lines is a straight coplanar microwave line.

14. The modulator as claimed in claim 1, wherein the first and second electrical lines each extend in a distance to the first and second waveguide electrodes.

15. The modulator as claimed in claim 1, wherein the first waveguide electrodes and the second waveguide electrodes are arranged on top of and along the first and second optical waveguide, respectively.

16. The modulator as claimed in claim 1, wherein the first waveguide electrodes and the second waveguide electrodes are arranged periodically and with a distance from one another.

17. A Mach-Zehnder modulator comprising:
a first optical waveguide forming a first modulator arm and a second optical waveguide forming a second modulator arm of the Mach-Zehnder modulator;
an electrode arrangement comprising a plurality of first waveguide electrodes for applying a voltage across the first optical waveguide and a plurality of second waveguide electrodes for applying a voltage across the second optical waveguide, wherein at least one voltage source is to be connected to the first waveguide electrodes and the second waveguide electrodes in such a way that the potential of the first waveguide electrodes is different from the potential of the second waveguide electrodes; and
at least one electrically conductive connecting element generating a short-circuit between at least one of the first waveguide electrodes and at least one of the second waveguide electrodes,
wherein the first waveguide electrodes are galvanically separated from one another and the second waveguide electrodes are galvanically separated from one another, and
further comprising a plurality of driver units, wherein each one of the driver units is assigned to one of the first waveguide electrodes and to one of the second waveguide electrodes, wherein the driver units are realized by amplifiers.

18. The modulator as claimed in claim 17, wherein several but not all of the first waveguide electrodes and second waveguide electrodes are connected by electrically conductive connecting elements, wherein each electrically conductive connecting element generates a short-circuit between one of the first waveguide electrodes and one of the second waveguide electrodes.

19. An electro-absorption modulator, comprising:
a single optical waveguide;
an electrode arrangement comprising at least one waveguide electrode for applying a voltage across the optical waveguide and a first and a second electrical line,
wherein the first and the second electrical lines are located adjacent and on different sides of the optical waveguide, the electrical lines extending at least essentially parallel to the optical waveguide,
wherein at least one voltage source is to be connected to the waveguide electrode and the first and second electrical lines in such a way that the potential of the waveguide electrode is different from the potential of the first and second electrical lines; and
at least one electrically conductive connecting element generating a short-circuit between the waveguide electrode and at least one of the first and second electrical lines,
wherein the at least one voltage source is connected to the waveguide electrode and the first and second electrical lines via an electrical line that is arranged in addition to the connecting element which generates the short-circuit.

20. The modulator as claimed in claim 19, wherein the at least one waveguide electrode is arranged on top of the optical waveguide.

* * * * *

UNITED STATES PATENT AND TRADEMARK OFFICE
CERTIFICATE OF CORRECTION

PATENT NO.         : 9,140,955 B2
APPLICATION NO.    : 14/378942
DATED              : September 22, 2015
INVENTOR(S)        : Hoffmann Page 1 of 1

It is certified that error appears in the above-identified patent and that said Letters Patent is hereby corrected as shown below:

Specification

In Column 1, Line 54, delete "modulator;" and insert -- modulator, --, therefor.

In Column 3, Line 49, delete "short-curcuits" and insert -- short-circuits --, therefor.

In Column 5, Line 49, delete "waveguide," and insert -- waveguide; --, therefor.

In Column 7, Lines 41-42, delete "(e.g. 50 Ohm)" and insert -- (e.g. 50 Ohm)) --, therefor.

In Column 7, Line 64, delete "(e.g. in" and insert -- e.g. in --, therefor.

In Column 10, Line 52, delete "FIG. 5A" and insert -- FIGS. 5A --, therefor.

Claims

In Column 16, Line 23, in Claim 19, delete "is to be" and insert -- is --, therefor.

Signed and Sealed this
Fourteenth Day of June, 2016

Michelle K. Lee
*Director of the United States Patent and Trademark Office*